United States Patent
Martinez Sancho

(10) Patent No.: US 11,691,749 B2
(45) Date of Patent: Jul. 4, 2023

(54) AIRCRAFT WITH AN ENGINE CONTROL DEVICE IN THE ENGINE COMPARTMENT AND METHOD TO OBTAIN SUCH AIRCRAFT

(71) Applicant: Airbus Operations S.L., Madrid (ES)

(72) Inventor: Alberto Martinez Sancho, Madrid (ES)

(73) Assignee: AIRBUS OPERATIONS S.L., Madrid (ES)

(*) Notice: Subject to any disclaimer, the term of this patent is extended or adjusted under 35 U.S.C. 154(b) by 216 days.

(21) Appl. No.: 17/175,003

(22) Filed: Feb. 12, 2021

(65) Prior Publication Data
US 2021/0245889 A1    Aug. 12, 2021

(30) Foreign Application Priority Data
Feb. 12, 2020  (EP) ..................................... 20382097

(51) Int. Cl.
*B64D 31/14* (2006.01)
*B64F 5/40* (2017.01)
(Continued)

(52) U.S. Cl.
CPC ................ *B64D 31/14* (2013.01); *B64F 5/40* (2017.01); *B64D 2041/002* (2013.01); *F02D 2001/0095* (2013.01)

(58) Field of Classification Search
CPC .............. B64D 2041/002; B64D 31/14; F02D 2001/009; B64F 5/40
See application file for complete search history.

(56) References Cited

U.S. PATENT DOCUMENTS 5,033,010 A * 7/1991 Lawrence .......... G05B 23/0264
    346/33 TP
6,771,501 B2 * 8/2004 Coleman ................ F01D 25/26
    361/679.01
(Continued)

FOREIGN PATENT DOCUMENTS

| EP | 2 021 235 | 2/2009 |
| FR | 2 822 130 | 9/2002 |
| WO | 2007/138082 | 12/2007 |

OTHER PUBLICATIONS

Wikipedia, FADEC, Nov. 5, 2015, [https://web.archive.org/web/20151105222036/https://en.wikipedia.org/wiki/FADEC] (Year: 2015).*
(Continued)

*Primary Examiner* — Timothy D Collins
*Assistant Examiner* — Justin Michael Heston
(74) *Attorney, Agent, or Firm* — Nixon & Vanderhye P.C.

(57) ABSTRACT

A method to modify an aircraft including: disconnecting a first engine control device from command cables and transmission cables, wherein the first engine control device is in a fuselage section forward of a pressure bulkhead; replacing the engine control device with a jumper connector positioned in the fuselage section, wherein the jumper connector electrically connects the command cables to the transmission cables; installing a second engine control device in the fuselage aft of the pressure bulkhead, wherein the second engine control device is in an engine compartment of the fuselage; connecting the second engine control device to transmission cables at a location at or near the pressure bulkhead; connecting sensor cabling directly to the second engine control device, and connecting the engine control device directly to the engine.

14 Claims, 3 Drawing Sheets

(51) Int. Cl.
*F02D 1/00* (2006.01)
*B64D 41/00* (2006.01)

(56) References Cited

U.S. PATENT DOCUMENTS

| | | |
|---|---|---|
| 2009/0099755 A1 | 4/2009 | Harbert |
| 2009/0192668 A1* | 7/2009 | Payne .................... G07C 5/085 |
| | | 701/33.4 |
| 2011/0084169 A1* | 4/2011 | Menne ...................... B64C 1/10 |
| | | 244/129.1 |
| 2014/0182306 A1 | 7/2014 | Castagnera |
| 2014/0313689 A1* | 10/2014 | Pickard .............. H01R 13/6666 |
| | | 361/818 |
| 2016/0229513 A1* | 8/2016 | Scheel ................... B64D 29/08 |
| 2016/0341128 A1 | 11/2016 | Juarez Becerril et al. |
| 2018/0038284 A1 | 2/2018 | Patry et al. |
| 2019/0312439 A1* | 10/2019 | Cottrell ................. B64D 31/14 |
| 2020/0354075 A1* | 11/2020 | Wong ..................... B64D 27/26 |

OTHER PUBLICATIONS

Extended European Search Report for EP 20 38 2097 dated Sep. 8, 2020, 8 pages.

\* cited by examiner ative thrust to the aircraft as do primary engines on
AIRCRAFT WITH AN ENGINE CONTROL DEVICE IN THE ENGINE COMPARTMENT AND METHOD TO OBTAIN SUCH AIRCRAFT This application claims priority to European Patent Application 20382097-2, filed Feb. 12, 2020, the entirety of which is incorporated by reference.

TECHNICAL FIELD

The invention relates to an apparatus and method for adding functions to an installed engine in the fuselage of an aircraft. More particularly the invention relates to the installation of devices for sensing and controlling of an engine in the aircraft.

BACKGROUND

Commercial aircraft typically include an auxiliary power unit (APU) in an engine compartment within the fuselage. APUs provide auxiliary power to the aircraft when the aircraft is on ground or in the air, and particularly when the main engines that provide aerodynamic thrust are not operating.

APUs are given new functions from time to time, such as to reduce aircraft fuel consumption and facilitate aircraft maintenance. With these new functions come requirements for new sensors and associated components to be added to the aircraft. Similarly, the new functions of the APU may have new control functions that require new control components to be added to the aircraft.

Adding new sensor and control components to an existing aircraft typically includes adding sensors, control devices, cabling and harnesses for the cabling. New components add weight and cost to an aircraft. They also present design and assembly challenges to integrate new components into an already complex commercial aircraft. Further, new components add to maintenance requirements of an aircraft. Accordingly, there is a need to ease the burden of adding new components to an aircraft when new functions are added to the APU or another internal engine on the aircraft.

SUMMARY

The invention allows new functions to be more easily added to an internal engine, e.g. APU, in an existing aircraft. The invention may be embodied to provide a retrofit solution to existing aircraft to add functions associated with the internal engine, e.g., APU. Further, the invention may be embodied as a simple, safe and effective way to provide new sensing and control components associated with new functions of an internal engine, such as an APU. The invention may be used to provide a method to modify the configuration of an aircraft with a minimal impact on all already installed devices and cable harnesses.

The invention may be embodied as an aircraft comprising: an engine, an engine compartment in which the engine is installed, an engine control device adapted to control at least one parameter of the engine, wherein the engine control device is installed in said engine compartment. The engine compartment may be a section of the fuselage of an aircraft. The engine may for example be a gas turbine, an internal combustion engine, or other type of power generation device. The engine may be an APU that does not provide aerodynamic thrust to the aircraft as do primary engines on the aircraft.

The invention may also be embodied as a method for adding a function to an existing engine, e.g., an APU, housed in an engine compartment in the fuselage. The method includes: connecting a jumper connector to command cables connected to an engine command device and to a first extremity of transmission cables adapted to transmit electrical signals in the aircraft, and installing an engine control device in the engine compartment and connecting the engine control device to a second extremity of the transmission cables and to sensing cables connected to sensors.

The aircraft may further comprise a command device adapted to output commands for the engine control device. The engine control device may be adapted to control at least one component of the engine, such as for example a fuel injector. The engine control device receives command signals from the command device and delivers corresponding control signals to one or more actuator components of the engine. The engine control device may be adapted to process command signals and produce control signals.

The command device may be activated by a human, or by a computer. The command device may be a computer. The command device may comprise a human-machine interface such as for example a lever or a microphone. The command device may also comprise a computer interface. The command device may be positioned in the cockpit or nose of the fuselage.

An output of the command device may be connected to an input of the engine control device. The command device and the engine control device are connected to each other by electric cables, such as command and transmission cables. An electrical cable, such as a command cable, is connected to the command device and may be adapted to transmit electrical command signals between the command device and the engine control device. A transmission cable may connect an existing engine control device to the engine in an engine compartment aft of a fuselage section where the existing engine control device is located.

The invention may comprise replacing an existing engine control device with a jumper connector. The jumper connector electrically connects at least one electrical command cable connected to the command device to an electrical transmission cable connected to a repositioned or new engine control device located near the engine, such as in an engine compartment.

The aircraft may comprise sensor cables connected to sensors and adapted to transmit electrical sensing signals. The sensor cables may comprise at least one sensor cable between a sensor and the engine control device. The sensor may be adapted to sense a parameter relative to the engine or to the engine compartment. The sensor cable transmits signals with information regarding the parameter from the sensor to the engine control device. The sensors, sensor cables and engine control device may be near the engine, such as in an engine control device.

The command cables may be used to transmit information signals between the engine control device and the command device. The engine control device may be able to control the APU based on the engine control device executing software, analyzing data received from sensor(s) of the APU and acting on commands received from the command device. The command device may output command signals to one or more engine control device(s). In such embodiments, the engine control device(s) may only transmit status signals to the command device. The signals transmitted by the engine control device(s) may include information regarding the status of the APU and information regarding data generated by one or more sensors and/or one or more actuators.

The aircraft may also comprise transmission cables adapted to transmit electrical signals along or through one or more fuselage section(s) of the aircraft. Transmission cables may have one end in the engine compartment, at a separation between the engine compartment and another fuselage section, or mounted to a pressure bulkhead in the fuselage. The transmission cables transmit electrical signal to or from the engine section and engine compartment within the engine section.

The invention may be a method to reposition or replace an engine controller, where the prior configuration includes: a command device, one or more command cable(s), an engine control device in a fuselage section forward of the engine compartment, one or more transmission cable(s), one or more sensing cable(s) said sensing cable(s) being connected to at least some of said transmission cable(s), and one or more sensor(s). The prior configuration is modified such that a jumper connector replaced the prior engine control device and links the command and transmission cables, and the engine control device is repositioned to the engine compartment or replaced by an engine control device installed in the engine compartment. The engine control device in the engine compartment is connected to the transmission cable and directly to sensor cables within the engine compartment.

The engine control device may thus be relocated from a fuselage section different from the engine section, to the engine section. Also, a new engine control device with additional inputs may thus be installed in the engine section. The invention allows to add additional sensors to the engine or the engine section and connect them to a new engine control device without having to install additional transmission cables in the fuselage.

The invention avoids or reduces the need to add control and transmission cables. Reusing existing control and transmission cables saves time and effort as command device are generally situated in the nose or cockpit section of the aircraft, while the engine section hosting an APU is generally situated in an aft section of the aircraft. The transmission cables are therefore particularly long and replacing these cables or adding new cables would imply significant work on the aircraft.

The invention allows a simple actualization of an aircraft production line, or a simple retrofit of an existing aircraft while adding new functionalities to the sensing and controlling of an engine.

The engine compartment may be housed in a fuselage section, called engine section. In some embodiments of the invention, the engine section may form an engine compartment.

The command device may be installed in a fuselage section of the aircraft different from the engine section. The command device may be installed in the nose of the aircraft which may be associated with a cockpit.

In particular, when the engine is installed in an engine compartment, the command device may still be installed in a fuselage section different from the engine section in which the engine compartment is installed.

The engine may comprise at least one sensor connected to the engine control device.

The engine may be connected to or monitored by sensors mounted into or to the engine in the engine compartment. The sensors may be for example speed sensors, oil level sensors, temperature sensors, pressure sensors, and other types of sensors monitoring the engine or the engine compartment. The sensors may be situated in the engine section and directly connected to the engine control device. Such sensors may sensing parameter relative to the engine, and parameters relative to the engine section/compartment such as for example a temperature in the engine section/compartment, presence of fumes in the engine section, and other environmental or structural conditions of the engine section/compartment. The sensors may communicate wirelessly to the engine control device due to the proximity between the sensors and the engine control device. The engine control device may be adapted to receive wireless signals from at least one sensor. The installation of additional sensors or replacement of sensors may be facilitated with wireless sensors. The proximity of the engine control device placed in the engine section allows the use of low power, small distances wireless technologies.

The engine may comprise one or more actuators. Such actuators may be for example valve actuators, an air intake actuator, a fuel actuator and other actuators that perform control functions for the engine. The actuators are controlled by the engine control device.

The engine compartment may be insulated from its surroundings by a firewall. The engine compartment may be encased in a firewall. The firewall may define the boundaries of the engine compartment. The engine compartment may be installed in and thermally insulated from its surrounding engine section. Alternatively or in combination, the engine section is separated from an adjacent fuselage section by a firewall. The engine control device may be installed within the engine compartment and within a firewalled section of the engine compartment.

The engine control device may be fire resistant. In particular it may comprise a dedicated fireproof casing. The engine control device, installed within the engine compartment is thereby adapted to resist to fire in case of such event, such that it may continue to ensure its function.

The engine control device may be adapted to transmit data to the command device.

The engine control device may be adapted to receive sensing data from one or more sensor(s) adapted to sense at least one parameter relative to the engine or to the engine section. The engine control device may be adapted transmit such sensing data to another device, such as the command device for example. The engine control device may be adapted to process such sensing data and transmit a corresponding reporting signal to said other device.

The invention may be embodied as a method for modifying the installation configuration of an aircraft comprising a compartment, such as an engine compartment, with an engine installed in said compartment, in which: an engine control device is connected to command cables, said command cables being adapted to be connected to a command device and connected to a first extremity of transmission cables adapted to transmit electrical signals in the aircraft, the engine control device is disconnected from both the command cables and the transmission cables, a jumper connector is connected in lieu of the engine control device between the command cables and the transmission cables, an engine control device is connected to a second extremity of the transmission cables and sensing cables connected to sensors.

The engine control device connected between the second extremity of the transmission cables and the sensing cables may be the same engine control device as removed from its location between the command cables and the first extremity of transmission cables, or may be another engine control device, for example of a new generation.

The method allows to retrofit an aircraft with improved capabilities. It allows for example to add additional sensors in the engine section, without having to install new transmission cables along the aircraft fuselage.

The transmission cables may be disconnected from the sensing cables before the engine control device is connected to the transmission cables and the sensing cables.

The engine control device may be introduced between the transmission cables and the sensing cables.

A method according to the invention may further comprise installing the engine control device in the engine compartment.

A method according to the invention may further comprise adding at least one sensor in the engine section and connecting it to an input of the engine control device.

As mentioned, such additional sensors may have cables, or may be wireless. The installation of a new engine control device allows for the installation of such additional sensors. Indeed an engine control device with more inputs may be conceived and installed in the engine section than the engine control device previously installed at a remote location in the aircraft.

The invention also extends to other possible combinations of features described in the above description and in the following description relative to the figures. In particular, the invention extends to aircraft sections comprising features described in relation to the aircraft and/or the method for modifying an aircraft; the invention extends to aircrafts comprising features described in relation to the method for modifying an aircraft; the invention extends to methods for modifying an aircraft comprising features described in relation to the aircraft.

The invention may be embodied as a method to modify an installation configuration of an aircraft including a fuselage, an engine compartment in the fuselage and an engine in the engine compartment, the method comprising: disconnecting a first engine control device from command cables and transmission cables, wherein the first engine control device is in a fuselage section of the fuselage forward of a pressure bulkhead; replacing the engine control device with a jumper connector positioned in the fuselage section, wherein the jumper connector electrically connects the command cables to the transmission cables; installing a second engine control device in the fuselage aft of the pressure bulkhead, wherein the second engine control device is in an engine section of the fuselage which includes the engine compartment for the engine; connecting the second engine control device to transmission cables at a location proximate to or aft of the pressure bulkhead; connecting sensor cabling directly to the second engine control device, and connecting the engine control device directly to the engine.

The invention may be embodied as a method to add or move an engine control device for an auxiliary power unit (APU) in an engine compartment of an aircraft fuselage, the method comprising: providing a first engine control device mounted in a fuselage section forward of a pressure bulkhead in the fuselage, wherein the first engine control device is connected to control cables to a control device in a nose or cockpit of the fuselage, and to transmission cables extending aft through the fuselage to at least the pressure bulkhead and are connected to sensing cables connected to sensors in the engine compartment and monitoring the APU and to actuator cables connected to actuators connected to the APU; disconnecting the first engine control device from the command cables and from the transmission cables; replacing the first engine control device with a jumper connector positioned in the fuselage section, wherein the jumper connector electrically connects the command cables to the transmission cables; installing a second engine control device in the engine compartment or an engine section of the fuselage housing the engine compartment; connecting the second engine control device to the transmission cables at a location proximate to or aft of the pressure bulkhead; connecting sensor cabling directly to the second engine control device, and connecting the engine control device to actuators configured to actuate the engine.

Some specific exemplary embodiments and aspects of the invention are described in the following description in reference to the accompanying figures.

DETAILED DESCRIPTION

Figure 1:
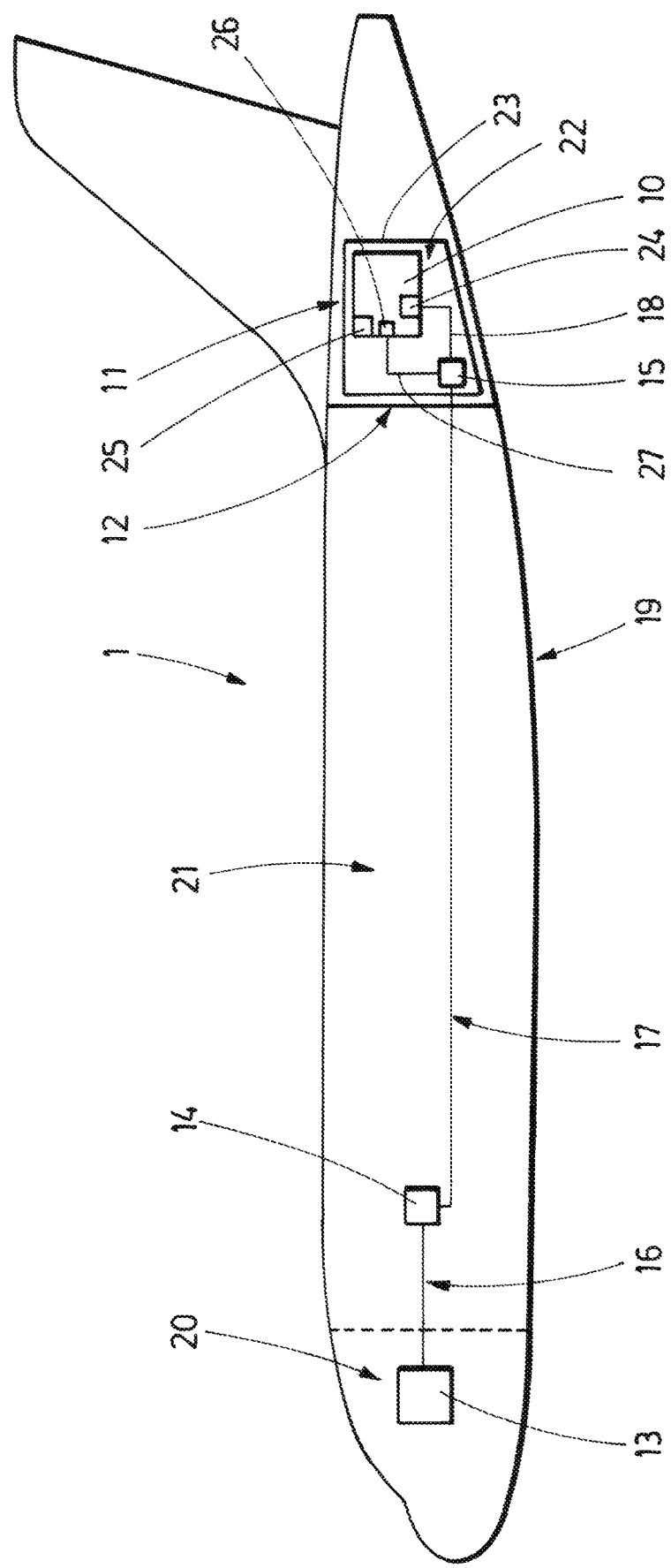
FIG. 1 is a schematic representation of an aircraft in a cross-section along a longitudinal axis of the aircraft, according to an embodiment of the invention.

FIG. 1 shows an aircraft 1 having a fuselage 19 formed of a plurality of fuselage sections, including a nose section 20 or cockpit situated at or near the front of the fuselage. The aircraft fuselage includes an engine section 11 that is configured to receive an engine 10, such as an auxiliary power unit (APU)

The engine section 11 includes an engine compartment 22 that houses the engine 10. The engine section 11 and compartment 22 may be situated towards or at the rear of the fuselage, such as below the vertical tail and/or in a tail cone of the fuselage. The engine section 11 is separated from the nose section 20 by one or more intermediate fuselage sections 21.

The engine section 11 and engine compartment 22 are separated by a wall 12 from other fuselage sections, such as a fuselage section immediately forward of the engine section. The wall 12 may be a pressure bulkhead in the fuselage separating a passenger section from a tail section of the fuselage.

A firewall 23 defines or is within the engine compartment 22. The firewall 23 isolates the APU within the engine compartment from the other sections of the fuselage and other aircraft elements, such as the vertical and horizontal tails. The firewall 23 provides thermal protection, e.g. fire protection, for the rest of the fuselage and the aircraft. The firewall may function to confine to the engine compartment heat and flame in the event of a failure of the APU.

The aircraft 1 further includes an engine control device 15 situated in the engine section 11, such as the engine compartment 22 of the engine section. The engine control device 15 is connected through a control cable 27 to at least one controllable element 26 of the APU, such as for example an APU actuator. The engine control device 15 is also connected to a sensor 24 of the APU 10 through a sensing cable 18.

The engine control device 15 may communicate to a wireless sensor(s) 25 through a wireless connection(s). The engine control device 15 includes a wireless communication port connected to a transceiver in the device 15. The proximity of the engine control device with the APU, as both are installed in the engine section 11, allow for wireless communication between one or more sensors 25 of the engine and the engine control device. These short range wireless communications can be configured to avoid interfering with other wireless communications within the aircraft such as in the cockpit. Short distance wireless communication protocols with a low energy consumption may be used for communications between the sensors, the APU and the engine control device. The engine control device 15 may also communicate wirelessly with one or more controllable actuator elements of the APU 10.

The aircraft comprises a command device 13 situated in the nose section or cockpit. The command device 13 may be an on-board computer. The command device is adapted to output command signals for the engine control device 15. The engine control device is adapted to convert such command signals into control signals for the controllable elements of the APU 10, sensors 24 and controllable elements 26.

The engine control device 15 is connected to the command device 13 by one or more cables, including command cables 16 and transmission cables 17 that provide electrical connections for command signals, status signals and possibly electrical power. In the embodiment of FIG. 1, the command device is connected to the engine control device through: (i) command cables 16 connected to the command device 13 at a first end and to a jumper connector 14 at a second end; and (ii) transmission cables 17 connected to the jumper connector 14 at a first end and to the engine control device 15 at a second end. The jumper connector 14 is adapted to electrically connect the command cables 16 to the transmission cables 17.

In this embodiment, the transmission cables 17 end at a junction box 28 providing a wiring connections and mounted to or proximate the wall 12. The engine control device 15 is connected to the junction box. The junction box r 28 may be a wired connector installed in or mounted to the wall 12 and may be within or external to the engine compartment 22.

Figure 2:
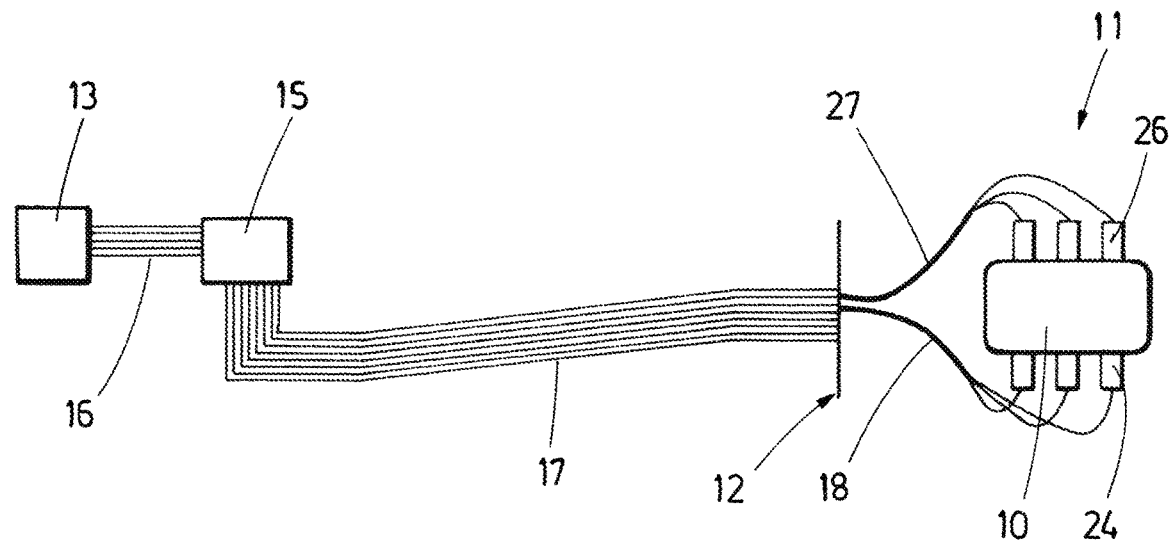
FIG. 2 is a schematic representation of a control and sensing line of an engine in an aircraft before the application of a method according to the invention.

The jumper connector 14 may be situated in one of the intermediate fuselage sections 21, and may at a location of a preexisting control device such as shown in FIG. 2.

Figure 3:
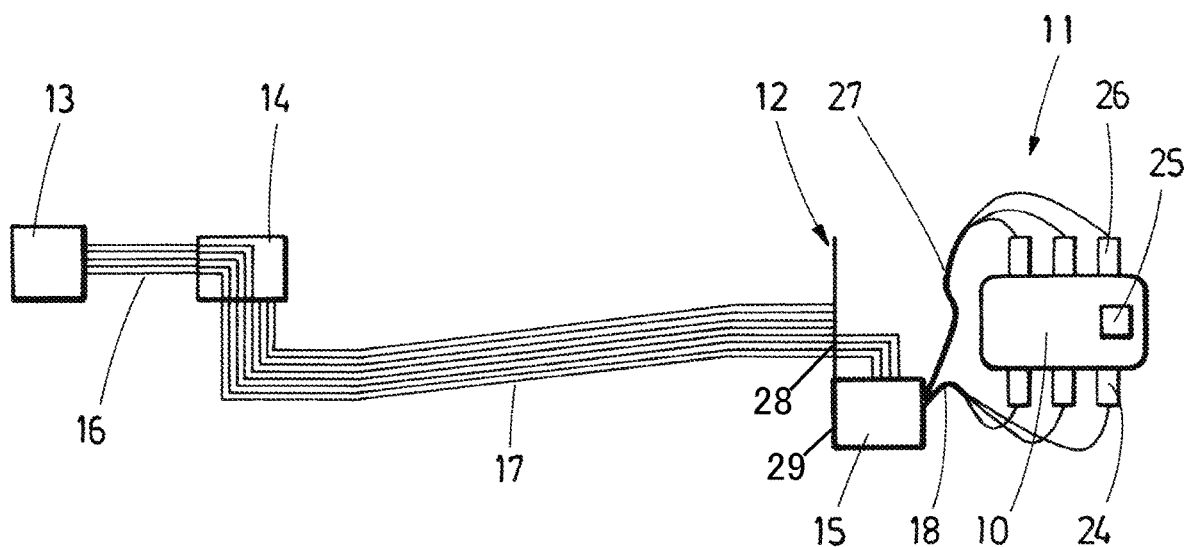
FIG. 3 is schematic representation of a control and sensing line of an engine in an aircraft according to the invention.

The jumper connector 14 may replace an existing engine control device 15, such as shown in FIG. 2, and be placed where the engine control device was previously located, as shown in FIG. 3. The engine control device 15 may be moved to the engine compartment 22 or be replaced by a new engine control device 15 placed in the engine compartment. The preexisting wiring 16, 17 associate with the preexisting engine control device may be connected by the jumper connector 14 and used to provide signal communications between the command device 13 and the new or repositioned engine control device 15. The preexisting wiring may include command cables 16 and transmission cables 17. Because preexisting wiring is used to transmit signals between the command device 13 and the new or repositioned engine control device, there is no need to add new wiring and associated wiring harnesses for the new or repositioned engine control device.

The engine control device 15 may assume more functions as compared to the preexisting engine control device. The new functions may be receiving signals from sensors monitoring the APU. Because the engine control device is in the engine section 11 and/or the engine compartment 22, new cables are not needed to be added to intermediate fuselage sections 21.

FIG. 2 shows a configuration in an aircraft before the method of the invention is performed. FIG. 2 shows a command device 13 connected to an engine control device 15 through command cables 16. The engine control device is in a section of the fuselage forward of the wall 12 and the engine section 11. The engine control device 15 is connected by wiring 17, e.g., transmission cables, to sensors 26 and controllable elements 24 of an APU 10. The wiring extends through the fuselage between the engine control device 14 and the wall 12. At the wall 12, the wiring 17 connects to sensing cables 27 and/or control cables 18. These sensing cables 27 and control cables 18 are connected with the wiring 17, e.g., transmission cables, at a wiring connecting interface at the wall 12 of the engine section 11.

FIG. 3 shows a configuration of an aircraft that embodies the invention. The configuration in FIG. 3 shows the results of performing a method of the invention to modify the configuration shown in FIG. 2. As shown by a comparison of FIG. 2 and FIG. 3, the engine control device 15 has been displaced from a forward or middle fuselage section to the engine section 11. The engine control device 15 may be the preexisting engine control device or may be a new engine control device that replaces the engine control device shown in FIG. 2. The new engine control device may thereby comprise additional functions such as additional inputs for sensors and/or wireless communication means. The new engine control device may also be fireproof or housed in a fireproof container 29

The previous engine control device shown in FIG. 2 was installed in an intermediate fuselage section. As shown in FIG. 3, the previous engine control device is replaced by a jumper connector 14. The jumper connector ensures the continuity of signal transmission between the command cables 16 and the transmission cables 17, and of signal communications between the control device 13 and the engine control device 15.

The engine control device 15 is connected to the transmission cables 17 at the connecting interface connector 28 at or new the wall 12. The sensing cables 27 and control cables 18 within the engine compartment may be directly connected to the engine control device 15 in the engine section, such as in the engine compartment. If the engine control device is in the engine compartment, the engine control device should be fireproof or housed in a fireproof container 29.

Moreover, in this embodiment, the APU has been equipped with an additional wireless sensor 25 adapted to communicate with the new engine control device 15 installed in the engine section 11. Because of the short distances between the APU, its sensors and the engine control device in the engine compartment with the APU, it would be appropriate to use short range wireless communication signaling between the sensors, APU actuators and the engine control device.

Figure 4:
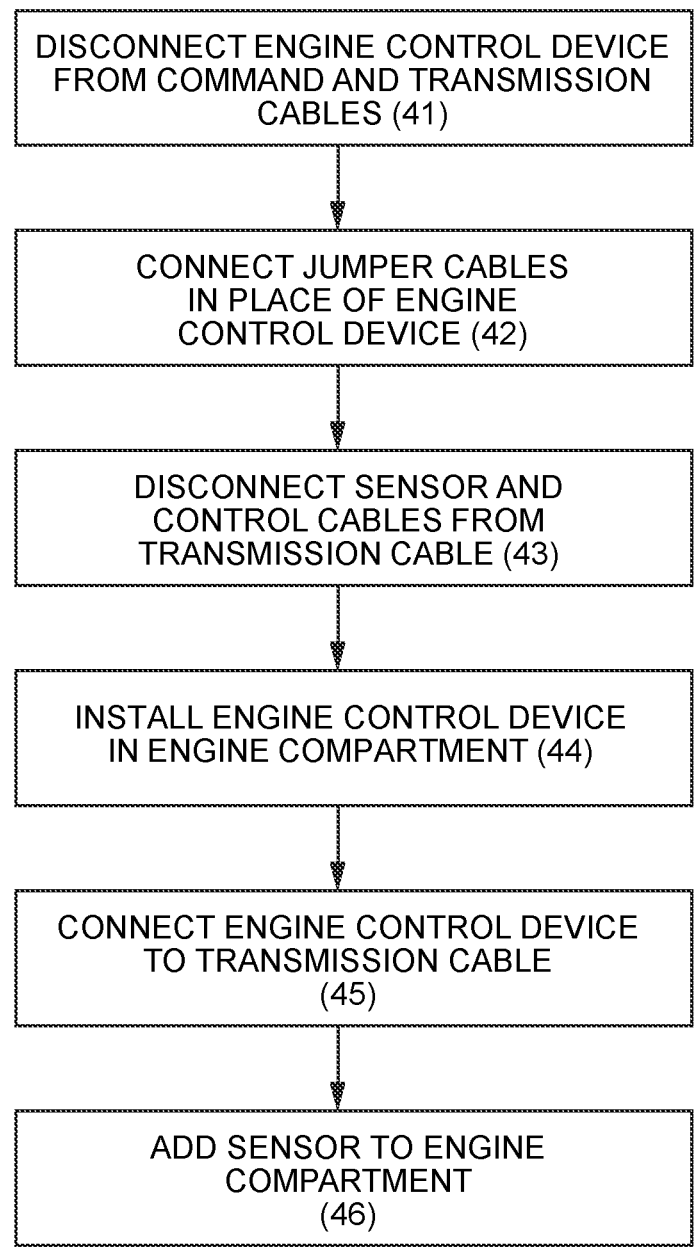
FIG. 4 is a schematic representation of a method according to the invention.

Steps of a method according to the invention, are schematically represented in FIG. 4. The following steps may be followed in this or a different order.

In a first step 41, an existing engine control device as represented in FIG. 2, and installed in an intermediate fuselage section is disconnected from the command cables 16 and from the transmission cables 17.

In a second step 42, a jumper connector 14 is connected between the command cables 16 and the transmission cables 17. The jumper connector is positioned where the engine control device was previously positioned. The jumper connects the existing command cables and transmissions cables previously used by the preexisting engine control device.

In a third step 43, sensing cables 27 and control cables 18 are disconnected from the transmission cables 17.

In a fourth step 44, an engine control device 15 is installed in the engine compartment 22.

In a fifth step 45, the engine control device 15 is connected to the transmission cables 17. The engine control device may also be connected to the sensing cables 27 and control cables 18 in the engine compartment.

In a sixth step 46, an additional sensor 25 is added in the engine compartment 22 and connected to the engine control device 15, either with a cable or wirelessly.

The method of steps 41 to 46 allows an existing aircraft to be fitted with an engine control device.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method to modify an installation configuration of an aircraft including a fuselage, an engine compartment in the fuselage and aft of a pressure bulkhead in the fuselage, and an engine in the engine compartment, the method comprising:
    disconnecting a first engine control device from command cables and transmission cables, wherein the first engine control device is in a fuselage section of the fuselage forward of the pressure bulkhead;
    replacing the first engine control device with a jumper connector positioned in the fuselage section at a location corresponding to the first engine control device, wherein the jumper connector electrically connects the command cables to the transmission cables;
    installing a second engine control device in the fuselage aft of the pressure bulkhead, wherein the second engine control device is in an engine section of the fuselage which includes the engine compartment for the engine;
    connecting the second engine control device to transmission cables at a location proximate to or aft of the pressure bulkhead;
    connecting sensor cabling directly to the second engine control device, and
    connecting the engine control device directly to the engine.

2. The method according to claim 1, wherein the second engine control device is the first engine control device moved to the engine compartment.

3. The method according to claim 1, wherein the second engine control device is a separate device from the first engine control device.

4. The method according to claim 1, wherein the connecting the second engine control device to the transmission cables includes connecting the transmission cables to wiring connectors in a junction box at or near the pressure bulkhead, and connecting at the junction box wires from the second engine control device which wires are electrically connected to the transmission cables.

5. The method of claim 1, wherein the transmission cables are disconnected from sensing cables before the second engine control device is connected to the transmission cables.

6. The method according to claim 1, further comprising installing the second engine control device in a fireproof housing within the engine compartment wherein the engine is in the fireproof housing.

7. The method according to claim 1, further comprising adding a wireless sensor within the engine compartment, and the method further comprises:
    monitoring a parameter of the engine or the engine compartment by the wireless sensor;
    transmitting wirelessly a signal indicative of the parameter by the wireless sensor; and receiving by the second engine control device the signal.

8. A method to add or move an engine control device for an auxiliary power unit (APU) in an engine compartment and in of an aircraft fuselage, the method comprising:
    providing a first engine control device mounted in a first fuselage section forward of a pressure bulkhead in the fuselage, wherein the first engine control device is connected to at least one control cable also connected to a control device in a nose or cockpit of the fuselage, and the first engine control device is connected to at least one transmission cable extending aft through the fuselage and through the pressure bulkhead, wherein the at least one transmission cable is connected to at least one sensor cable connected to at least one sensor in the engine section, wherein the at least one sensor monitors the APU and the at least one transmission cable is connected to at least one actuator cable connected to at least one actuator configured to control the APU;
    disconnecting the first engine control device from the at least one command cable and from the at least one transmission cable;
    replacing the first engine control device with a jumper connector positioned in the first fuselage section at a location corresponding to a location of the first engine control device, wherein the jumper connector electrically connects the at least one command cable to the at least one transmission cable;
    installing a second engine control device in the engine compartment of the fuselage housing the APU;
    connecting the second engine control device to the at least one transmission cable at a location aft of the pressure bulkhead;
    connecting the at least one sensor directly to the second engine control device via the at least one sensor cable or via a replacement sensor cable, and
    connecting the second engine control device to the at least one actuator via the at least one actuator cable or a replacement actuator cable.

9. The method according to claim 8, wherein the second engine control device is the first engine control device moved to the engine section.

10. The method according to claim 8, wherein the second engine control device is a separate device from the first engine control device.

11. The method according to claim 8, wherein the connection of the second engine control device to the at least one transmission cable includes connecting the transmission cable to at least one wiring connector in a junction box proximate to or aft of the pressure bulkhead, and connecting at the junction box at least one cable from the engine control device to the transmission cables.

12. The method of claim 9, wherein the transmission cables are disconnected from the at least one sensor cable before the second engine control device is connected to the transmission cable.

13. The method according to claim 8, further comprising installing the second engine control device in a fireproof housing within the engine compartment wherein the engine is within the fireproof housing.

14. The method according to claim 8, further comprising adding a wireless sensor within the engine compartment and the method further comprises:
   monitoring a parameter of the APU or the engine compartment by a wireless sensor;
   transmitting wirelessly by the wireless sensor a signal indicative of the parameter; and
   receiving the signal by the second engine control device.

\* \* \* \* \*